United States Patent [19]
Löbner et al.

[11] Patent Number: 5,907,123
[45] Date of Patent: May 25, 1999

[54] METAL-SHEATHED HIGH-VOLTAGE LINE WITH A SECURING ELEMENT FOR AN INSULATING SUPPORT

[75] Inventors: Friedrich Löbner; Thomas Kelch; Manfred Meinherz, all of Berlin, Germany

[73] Assignee: Siemens Aktiengesellschaft, München, Germany

[21] Appl. No.: 08/860,209

[22] PCT Filed: Jan. 5, 1996

[86] PCT No.: PCT/DE96/00013

§ 371 Date: Nov. 24, 1997

§ 102(e) Date: Nov. 24, 1997

[87] PCT Pub. No.: WO96/22624

PCT Pub. Date: Jul. 25, 1996

[30] Foreign Application Priority Data

Jan. 20, 1995 [DE] Germany .................. 195 02 665

[51] Int. Cl.⁶ ......................................... H02G 5/06
[52] U.S. Cl. ........................................ 174/28; 174/99 B
[58] Field of Search ............................. 174/28, 14 R, 174/16.2, 24, 99 B

[56] References Cited

U.S. PATENT DOCUMENTS

| | | | |
|---|---|---|---|
| 3,809,795 | 5/1974 | Olsen et al. | 174/28 |
| 4,161,621 | 7/1979 | Bolin | 174/14 R |
| 5,416,266 | 5/1995 | Muller | 174/28 X |
| 5,571,990 | 11/1996 | Pham et al. | 174/24 |

FOREIGN PATENT DOCUMENTS

| | | |
|---|---|---|
| 2194024 | 2/1974 | France . |
| 2401497 | 3/1979 | France . |
| 536567 | 4/1973 | Switzerland . |

*Primary Examiner*—Kristine Kincaid
*Assistant Examiner*—Chau N. Nguyen
*Attorney, Agent, or Firm*—Kenyon & Kenyon

[57] ABSTRACT

A metal-sheathed high-voltage line with a high-voltage conductor and a metal sheath surrounding it coaxially has at least one securing element for a disk-shaped insulating support which has a first and second ring), each of which is concentric with the high-voltage conductor and each of which has a web projecting radially with respect to the longitudinal axis of the high-voltage line, where the insulating support is secured between the webs of the rings. The rings are jammed tightly by a wedge action on the high-voltage conductor.

10 Claims, 2 Drawing Sheets

METAL-SHEATHED HIGH-VOLTAGE LINE WITH A SECURING ELEMENT FOR AN INSULATING SUPPORT

FIELD OF THE INVENTION

The present invention relates to a high voltage line, and in particular a high voltage line having an insulating support for a metal sheath, the insulating support being fixed to the high voltage line with a securing element.

BACKGROUND INFORMATION

U.S. Pat. No. 4,161,621 describes a metal-sheathed, high-voltage line with a high-voltage conductor.

A securing element for insulating supports inside a metal sheath is described there, where rings are provided that are in contact with the metal sheath and support webs between which an insulating support is secured.

SUMMARY OF THE INVENTION

An object of the present invention is to provide an improved metal-sheathed high-voltage line with a high-voltage conductor surrounded coaxially by a metal sheath and with at least one securing element for a disk-shaped insulating support having a first and second ring, each of which is concentric with the high-voltage conductor and each having a web projecting radially with respect to the longitudinal axis of the high-voltage line. The insulating support is secured between the webs of the rings.

The aforementioned object is achieved according to the present invention by the fact that at least one of the rings directly surrounds the high-voltage conductor, and the rings are pressed against each other in the axial direction of the high-voltage line, where there is at least a first wedge body that can be pressed against the high-voltage conductor by wedge action due to the axial pressure force, causing the rings to be pressed together, and thus the securing element is jammed tightly on the high-voltage conductor.

In particular to compensate for thermal strain during operation of the high-voltage line, it is advantageous if the insulating supports are attached either only to the high-voltage conductor or to the metal sheath and slide along the other part. The design according to the present invention is advantageous inasmuch as the rings and the insulating supports can be threaded in succession onto the high-voltage conductor, and then the rings can be pressed together by means of axial screws, for example, to secure the respective insulating support between the webs and also to fix the securing element through the wedge action of the wedge body on the high-voltage conductor so it cannot be displaced.

This assembly can be performed, for example, before the high-voltage conductor is inserted into the metal sheath, but it is also possible to first insert the high-voltage conductor and then insert the insulating supports successively. This does not require any structural adjustments or machining of the high-voltage conductor.

It may be advantageous for a third ring with a conical outside contour on which the insulating support is jammed tightly to be provided between the first and second rings.

This third ring centers the insulating support relative to the high-voltage conductor if this is not already accomplished by the webs.

The webs may encircle the rings concentrically and coaxially with the high-voltage conductor. However, it is also possible to provide webs on the rings merely in the form of individual elevations on the outer circumference of the rings.

It may also be advantageous for the third ring to be connected in one piece to the first or second ring.

This facilitates assembly of the securing element. The two rings or the three rings may have axial boreholes passing through them to make it possible to press the rings together in the axial direction of the high-voltage line by means of screws.

Another advantageous embodiment of this invention provides for the insulating support to have a ring on its outer circumference designed to allow the insulating support to more easily slide along the inside wall of the metal sheath.

This design ensures an easily sliding connection between the insulating support and the metal sheath.

As a ring or partial ring with a wedge-shaped cross section, the wedge body may partially or entirely surround the high-voltage conductor. Several wedge bodies may also be distributed around the circumference of the high-voltage conductor. A first wedge body may also work together with a second wedge body to achieve a pressure force.

DETAILED DESCRIPTION OF THE INVENTION

Figure 1:
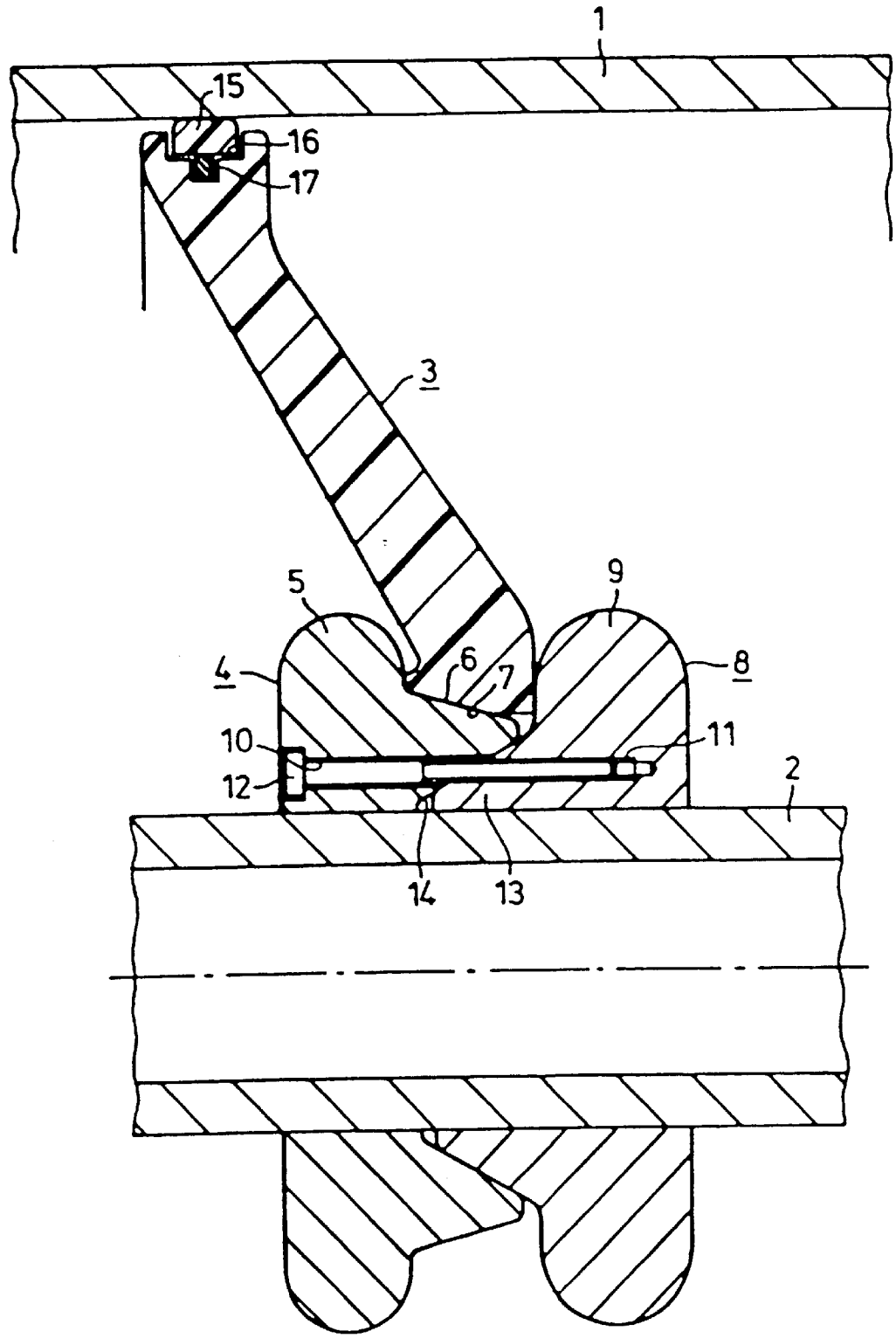
FIG. 1 shows a schematic cross section through an arrangement according to the present invention having two rings.

FIG. 1 shows schematically part of a metal sheath 1 and a high-voltage conductor 2. High-voltage conductor 2 is arranged coaxially inside the cylindrical metal sheath 1, and the center axis of this arrangement is indicated with dotted lines.

Figure 2:
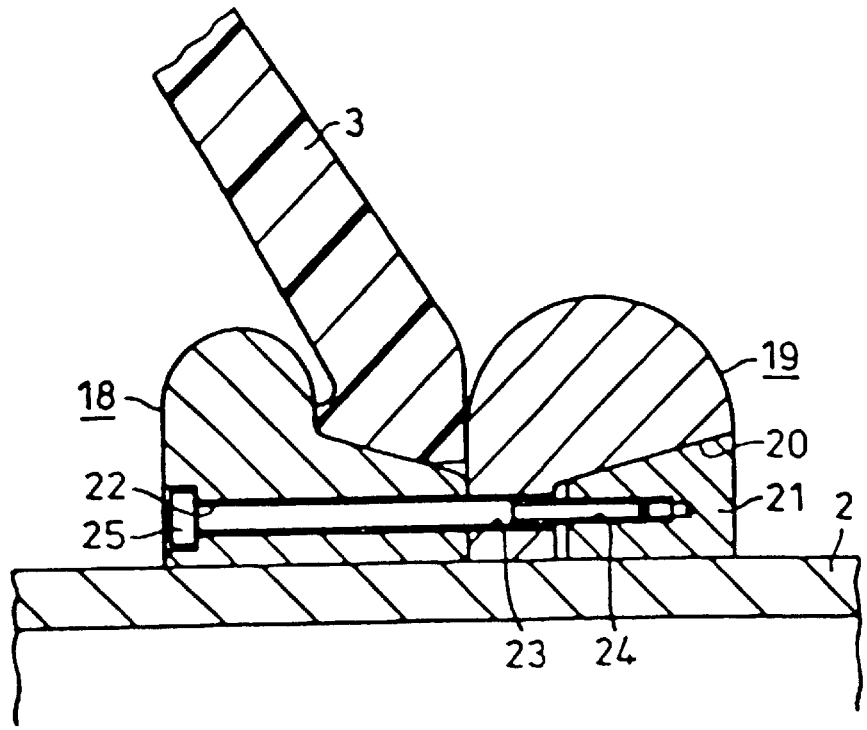
FIG. 2 shows an arrangement according to the present invention having two rings and a separate wedge body.
Figure 3:
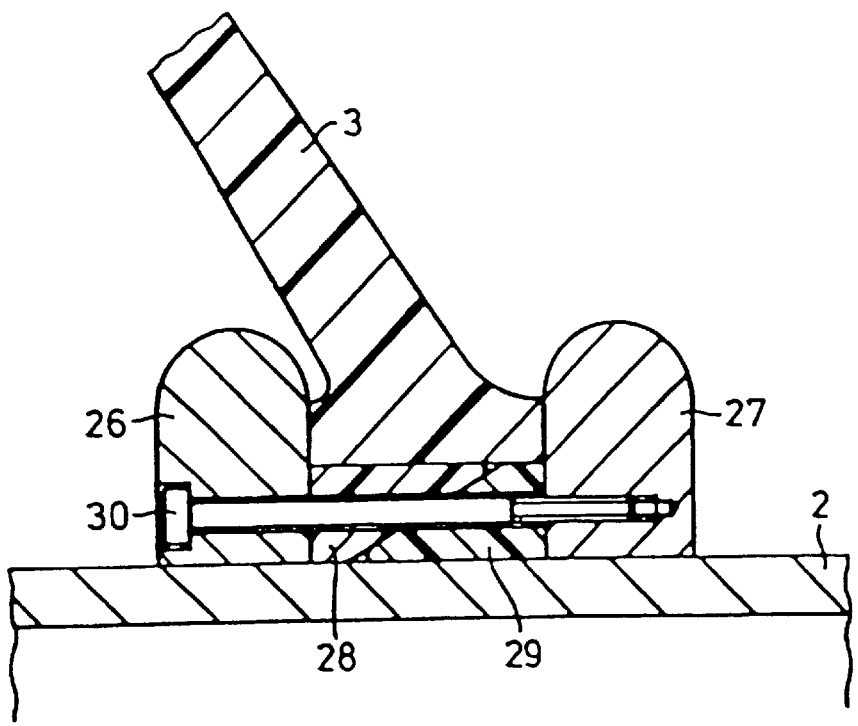
FIG. 3 shows an arrangement according to the present invention having two rings and two wedge bodies that work together.

Metal sheath 1 is omitted in FIGS. 2 and 3, and high-voltage conductor 2 is shown only partially.

FIG. 1 shows a disk-shaped conical insulating support 3 that supports high-voltage conductor 2 concentrically and coaxially inside metal sheath 1.

For this purpose, a first ring 4 that is concentric with high-voltage conductor 2 is pushed onto the conductor and has a web 5 on its outer circumference that is coaxial with high-voltage conductor 2.

Ring 4 also has a conical face 6 onto which is pushed insulating support 3 with a face 7 having an opposing conical design. Insulating support 3 is thus jammed tightly on ring 4.

Web 5 also forms a stop for insulating support 3 in the axial direction.

A second ring 8 is provided on the side of insulating support 3 opposite the first ring 4 and has a web 9 designed, for example, as a bulge on its circumference.

The two rings 4, 8 have, for example, aligned boreholes 10, 11 through which passes a screw 12 by means of which the two rings 4, 8 are pressed together in the axial direction.

In this way insulating support 3 can be secured in the axial direction between webs 5, 9 of rings 4, 8.

Second ring 8 is connected, for example, in one piece with a wedge body 13 encircling high-voltage conductor 2. Wedge body 13 works together with a conical face 14 of first ring 4 in such a way that when they are pressed axially together by, for example, screw 12, wedge body 13 is pressed against high-voltage conductor 2 by the approach of rings 4, 8 to each other and thus the two rings 4, 8 are jammed tightly by adhesive friction on high-voltage conductor 2. At the same time, insulating support 3 that is secured between rings 4, 8 is thus secured on high-voltage conductor 2.

In a circumferential groove 16, insulating support 3 has on its outer circumference, for example, a PTFE ring 15 that slides on the inside wall of metal sheath 1. Ring 15 may be divided, for example, and pressed against the inside wall of metal sheath 1 by a rubber ring 17 in groove 16. This guarantees that ring 15 is in constant contact with metal sheath 1. Ring 15 may also be designed as a conducting, metal-filled plastic body and preferably as a field control electrode.

Circumferential wedge body 13 may have radial slots to facilitate deformability.

In FIG. 2, insulating support 3 is secured between rings 18, 19. Second ring 19 has a conical face 20 that faces high-voltage conductor 2 and works together with a separate wedge body 21. Like rings 18, 19, wedge body 21 may be designed to encircle the circumference of high-voltage conductor 2. However, it is also possible for wedge body 21 to be divided into several partial circular rings with a wedge-shaped cross section. This must not result in any force being applied against the inherent stability of a continuous ring-shaped wedge body 21 when wedge body 21 is pressed against the surface of high-voltage conductor 2.

Rings 4, 8, 18, 19 as well as wedge bodies 13, 21 may be made of metal. In addition to their securing function, bulging webs 5, 9 of the rings then also act as field control electrodes to control the high-voltage potential. In such a design, the bulging rounded parts of the rings are to be regarded as the webs. However, wedge bodies 13, 21 in particular may also be manufactured as easily deformable insulating bodies, e.g., made of PTFE, if this is justifiable with regard to the dielectric properties. This can be ensured, for example, by having the insulation material filled with a finely divided conducting material to achieve a certain minimum conductivity.

Rings 18, 19 and wedge body 21 have, for example, aligned boreholes 22, 23, 24 through which pass screws 25, so the rings can be pressed axially against each other so that a radial pressure force acts on wedge body 21 due to the wedge action between face 20 of ring 19 and wedge body 21, thus tightly jamming the wedge body and thus the entire securing element on high-voltage conductor 2.

The arrangement illustrated in FIG. 3 shows two rings 26, 27 between which two wedge bodies 28, 29 encircling high-voltage conductor 2 are secured.

Insulating support 3 sits tightly on wedge bodies 28, 29.

Wedge body 29 has a wedge face that faces radially outward with respect to high-voltage conductor 2, and wedge body 28 has a conical face that faces inward accordingly, where the conical faces work together to produce a wedge action.

For this purpose, rings 26, 27 and wedge bodies 28, 29 have, for example, aligned boreholes passing through them to accommodate a screw 30 to produce an axial pressure force. With this arrangement, it is possible, for example, to manufacture rings 26, 27 of metal and also to design them as field control electrodes, and wedge bodies 28, 29 may be made of an insulating material without endangering the dielectric stability.

We claim:

1. A metal-sheathed high-voltage line comprising:
   a high-voltage conductor;
   a metal sheath coaxially surrounding the high voltage conductor;
   at least one disk-shaped insulating support having an inner end and an outer end; and
   at least one securing element connecting the insulating support to the high-voltage conductor, the securing element comprising:
   a first ring and a second ring, each concentric with the high-voltage conductor and each having a web, the web projecting radially from the high-voltage conductor; and
   a first wedge body disposed adjacent to the high-voltage conductor and adjacent to one of the first ring and the second ring, the first wedge body having a conical contour;
   wherein the inner end of the insulating support is secured between the web of the first ring and the web of the second ring and the outer end of the insulating support contacts the metal sheath;
   wherein at least one of the first ring and the second ring is disposed directly on the high-voltage conductor and surrounds a section of the high voltage conductor; and
   wherein when the first ring and second ring are pressed together one of the first ring and the second ring presses on the conical contour of the first wedge body, thereby pressing the first wedge body in the radial direction toward the high voltage conductor and securing the first wedge body to the high voltage conductor.

2. The metal-sheathed high-voltage line according to claim 1, further comprising:
   a wedge-shaped third ring having a conical outer contour, the third ring forming a second wedge body and disposed between the first ring and the second ring;
   wherein the inner end of the insulating support is pressed tightly against the third ring.

3. The metal-sheathed high-voltage line according to claim 2,
   wherein the third ring is integrally connected with one of the first ring and the second ring.

4. The metal-sheathed high-voltage line according to claim 1, further comprising:
   a ring disposed on the outer end of the insulating support, at least a part of the ring slidably contacting the metal sheath.

5. The metal-sheathed high-voltage line according to claim 1, further comprising:
   a second wedge body contacting the first wedge body, the second wedge body and first wedge body working together to produce a radial pressure force on the high-voltage conductor.

6. The metal-sheathed high-voltage line according to claim 5,
   wherein the first wedge body and the second wedge body are disposed between the first ring and the second ring.

7. The metal-sheathed high-voltage line according to claim 5, wherein one of the first wedge body and the second wedge body is integrally connected to one of the first ring and the second ring.

8. The metal-sheathed high-voltage line according to claim 5, wherein one of the first wedge body and the second wedge body is integrally connected to one of the first ring and the second ring, and wherein the other of the first wedge body and the second wedge body is integrally connected to the other of the first ring and the second ring.

9. The metal-sheathed high-voltage line according to claim 1, wherein the first wedge body is connected to at least one of the first ring and the second ring by at least one screw.

10. The metal-sheathed high-voltage line according to claim 9, wherein the screw runs generally in an axial direction with respect to the high-voltage conductor.

* * * * *